March 30, 1937. A. J. SMITH 2,075,363
APPARATUS FOR FORMING HOLLOW GLASS ARTICLES
Filed April 11, 1935 6 Sheets-Sheet 1
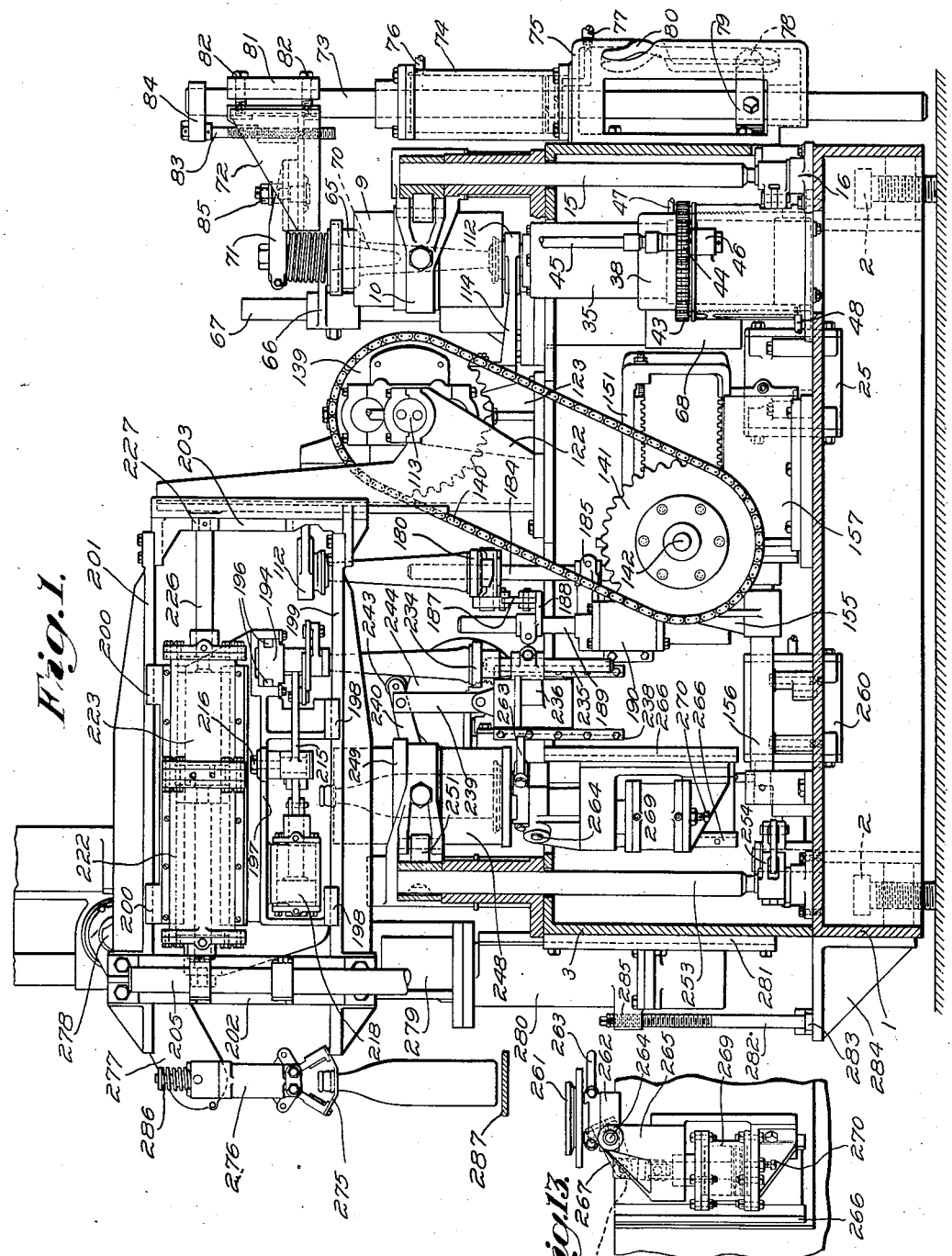
Inventor:
Algy J. Smith
by Brown + Parham
Attorneys
Witness:
W. B. Thayer.

March 30, 1937. A. J. SMITH 2,075,363
APPARATUS FOR FORMING HOLLOW GLASS ARTICLES
Filed April 11, 1935 6 Sheets-Sheet 2
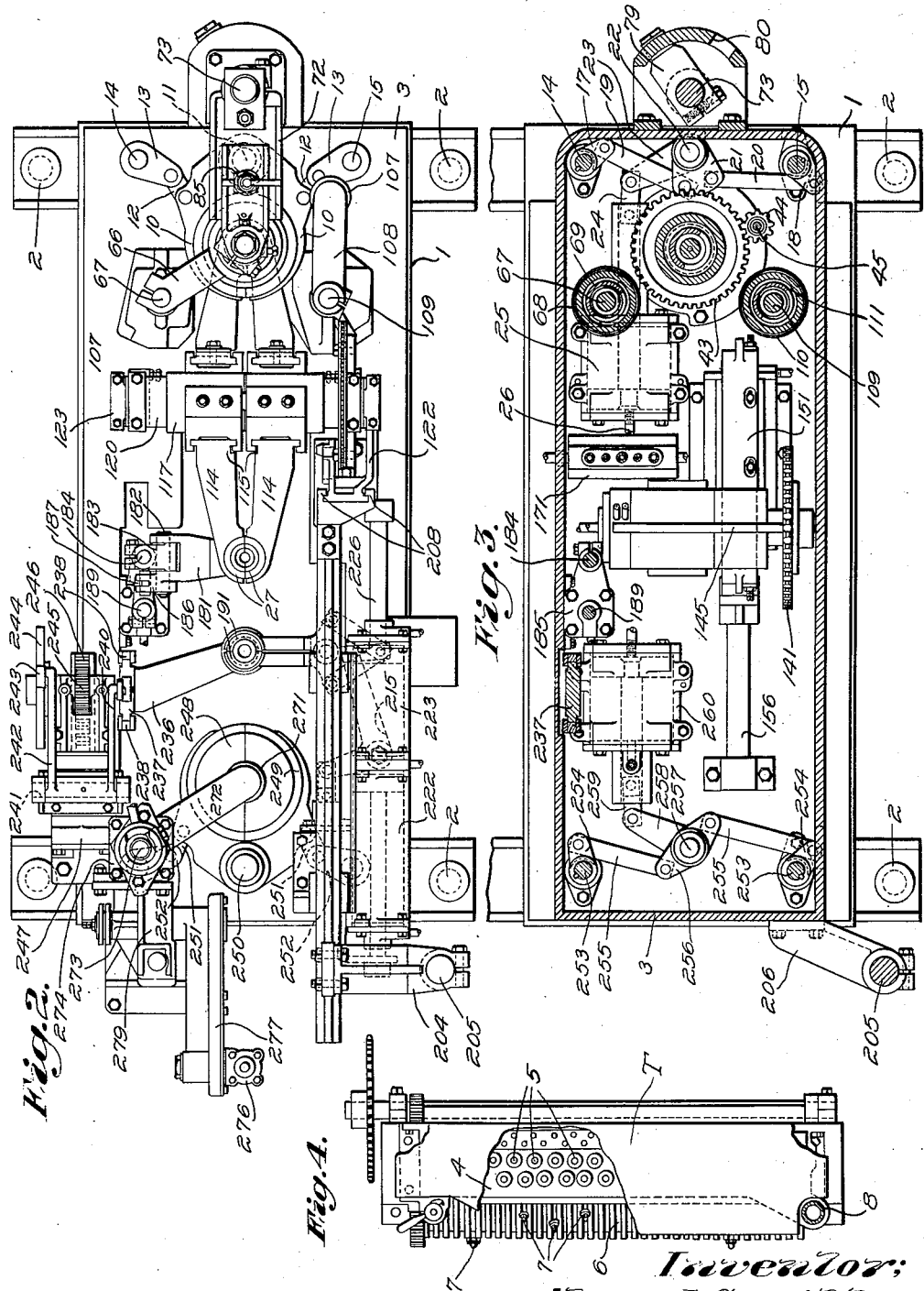
Inventor;
Algy J. Smith
by Brown & Parham
Attorneys March 30, 1937.   A. J. SMITH   2,075,363
APPARATUS FOR FORMING HOLLOW GLASS ARTICLES
Filed April 11, 1935   6 Sheets-Sheet 3
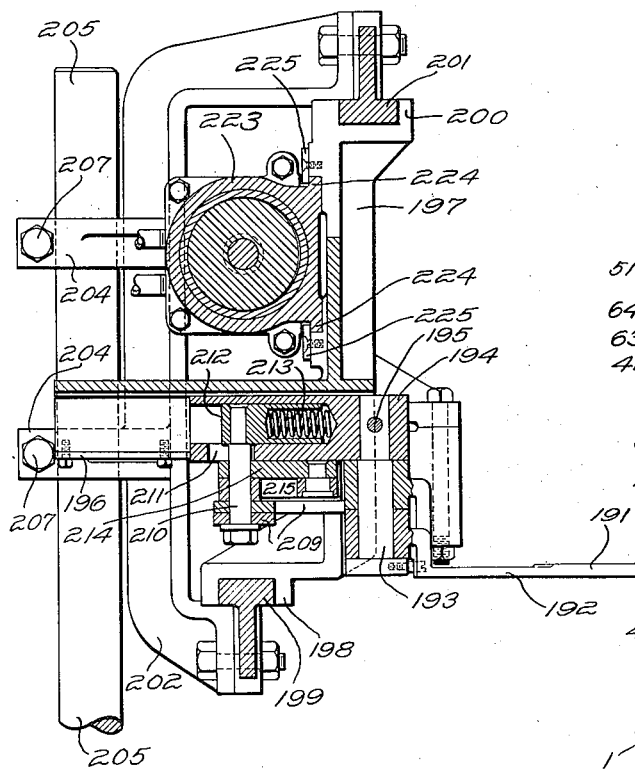
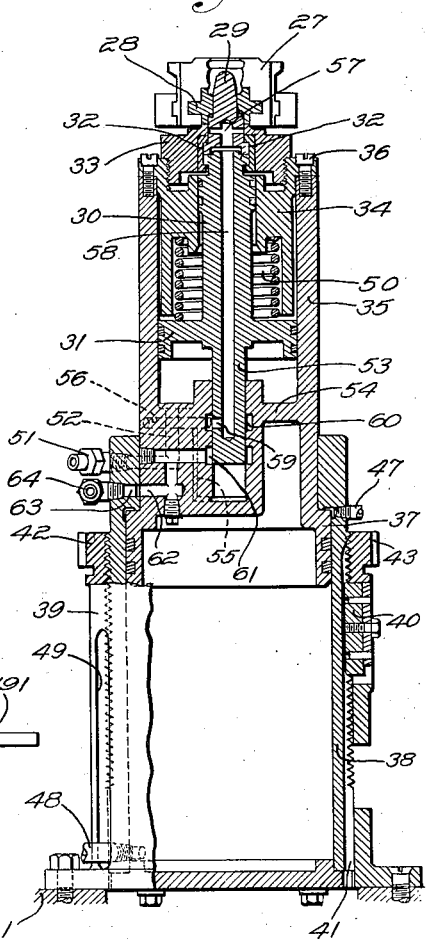

March 30, 1937.                A. J. SMITH                2,075,363
              APPARATUS FOR FORMING HOLLOW GLASS ARTICLES
                      Filed April 11, 1935        6 Sheets-Sheet 4
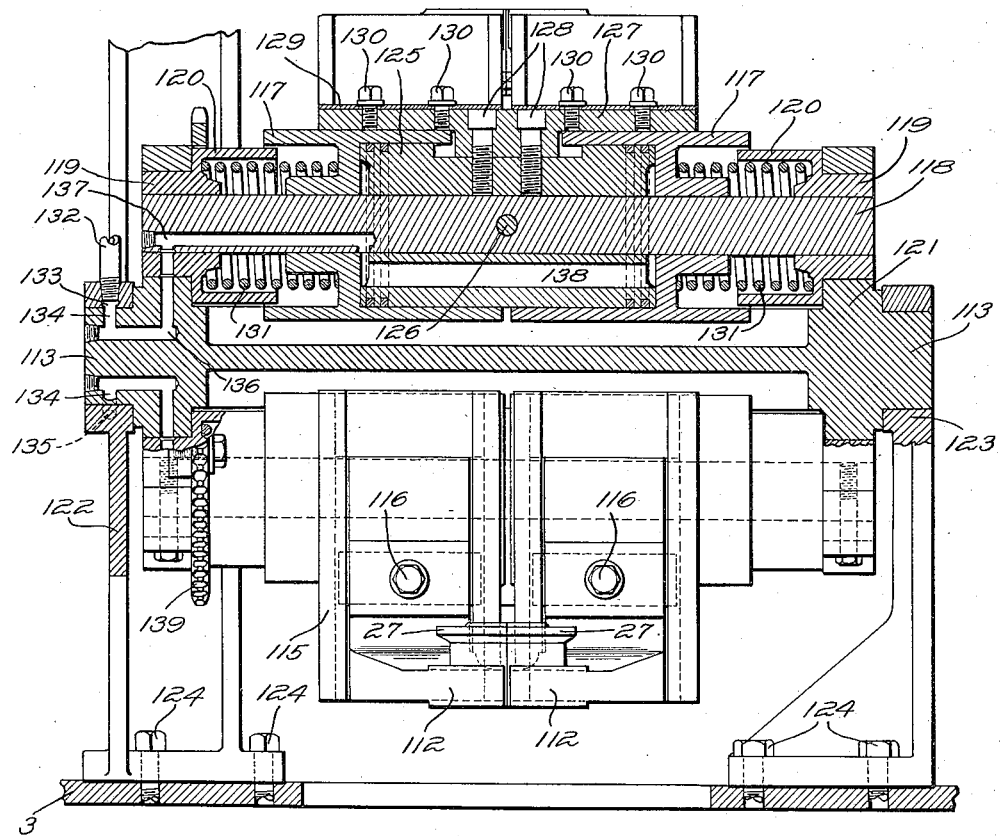
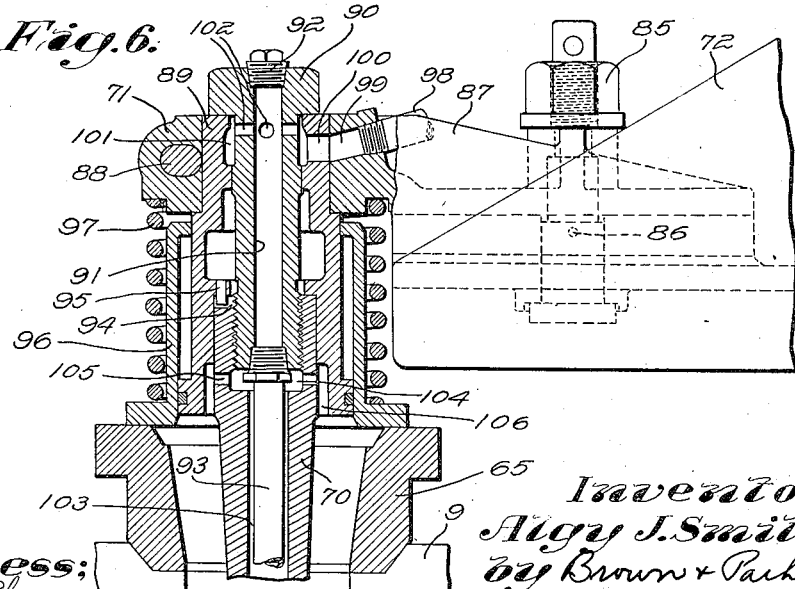
Inventor;
Algy J. Smith
by Brown + Parham
Attorneys
Witness;
W. B. Thayer.

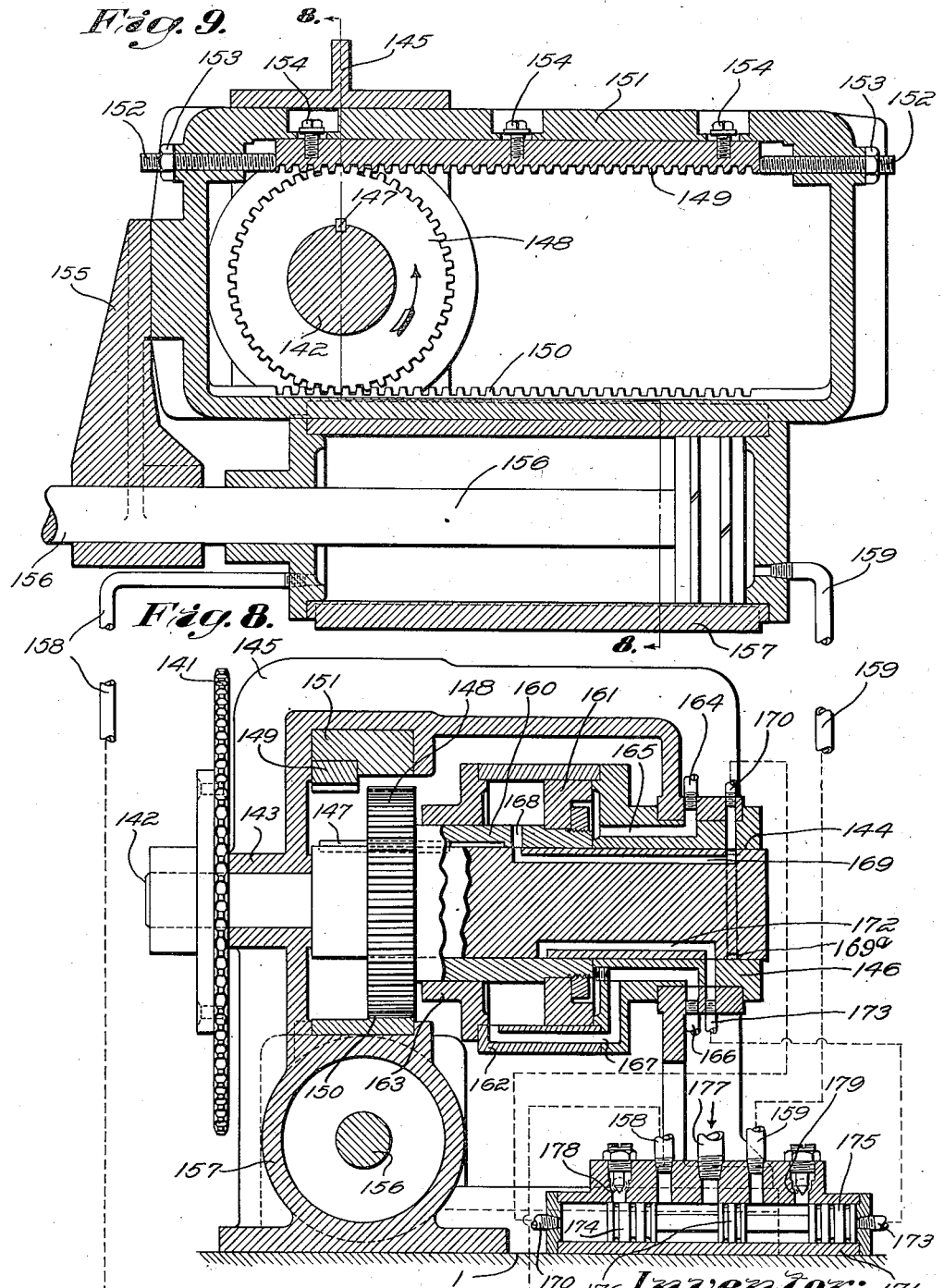

March 30, 1937. A. J. SMITH 2,075,363
APPARATUS FOR FORMING HOLLOW GLASS ARTICLES
Filed April 11, 1935 6 Sheets—Sheet 6

Patented Mar. 30, 1937

2,075,363

UNITED STATES PATENT OFFICE 2,075,363

APPARATUS FOR FORMING HOLLOW GLASS ARTICLES

Algy J. Smith, Bloomfield, Conn., assignor to Hartford-Empire Company, Hartford, Conn., a corporation of Delaware Application April 11, 1935, Serial No. 15,753

22 Claims. (Cl. 49—9)

This invention relates to apparatus for forming hollow glass articles and more particularly to apparatus of the type including a blank mold and a blow mold with transfer means therebetween of peculiar and novel character so arranged that the transferring and reheating of the blanks intermediate the blank and blow molds may be efficiently carried on and the machine as a whole may be rapidly and efficiently operated.

Among the objects of the present invention are to provide an apparatus for forming hollow glass articles and including a blank mold and a blow mold in which there is a transferring means for transferring blanks from the blank mold to the blow mold of duplex character and so arranged that the transferring means is moved in a unidirectional manner and in a single predetermined orbital path, more specifically the path being a circular one in a vertical plane, the transferring means specifically being neck rings cooperable alternately with the blank mold and arranged at 180° angles to each other about their common axis of inversion.

A further object of the invention is to provide in conjunction with the aforesaid combination for tongs for transferring articles from the duplex or plural blank gripping means to the blow mold, specifically in two stages, the initial part of the movement being to an intermediate reheating position and the secondary part of the movement from this reheating position to the blow mold.

A further object of the present invention is to provide in the aforesaid combination elongation controlling means at one or both the intermediate reheating positions for blanks during their transfer from the blank mold to the blow mold.

A further object of the present invention is to provide in the general combination aforesaid for the transferring of blanks from the blank mold to the blow mold in such manner that the longitudinal axes of the blanks being transferred is always maintained in the vertical plane containing the longitudinal axes of the blank and blow molds.

A further object of the present invention is to provide in the general combination aforesaid for so variably timing the opening of the neck rings and the closing of the tongs as to provide an adjustment of the duration of contact between each neck ring and the glass without affecting the total reheating time provided for the glass between its blank and blow mold contacts.

A further object of the present invention is to provide for the operation of a machine of the character above generally set forth in such manner that at least three and, under certain circumstances, four charges of glass, all of which were supplied to the same blank mold, may be simultaneously in the process of formation in the machine.

Other and more specific objects of the present invention will become apparent from the following description and appended claims when taken in connection with the accompanying drawings, in which:

Fig. 1 is a view principally in side elevation and partly in vertical section of substantially the entire machine;

Fig. 2 is a plan view of the machine;

Fig. 3 is a view partly in plan and partly in horizontal section of the bottom portion of the machine and the mechanism adjacent to the bottom portion thereof;

Fig. 4 is a view in plan with parts broken away of a timer suitable for use with the machine;

Fig. 5 is a view principally in vertical section of the neck pin and its mounting and the operating means therefor;

Fig. 6 is a fragmentary view partly in elevation and partly in vertical section of the charge settling plunger head in its cooperative relation with the funnel and the blank mold;

Fig. 7 is a view partly in elevation and partly in vertical section of the neck rings, their holders, and their opening and closing and inverting means;

Fig. 8 is a view principally in vertical section of the means for inverting the neck rings;

Fig. 9 is a view of certain of the apparatus shown in Fig. 8, the view being taken in vertical section at right angles to the view of Fig. 8;

Fig. 12 is a view substantially in transverse vertical section of the tongs and certain of their operating means; and Fig. 13 is a fragmentary detail view showing the blow mold bottom plate and its mounting and operating mechanism.

Figure 10:
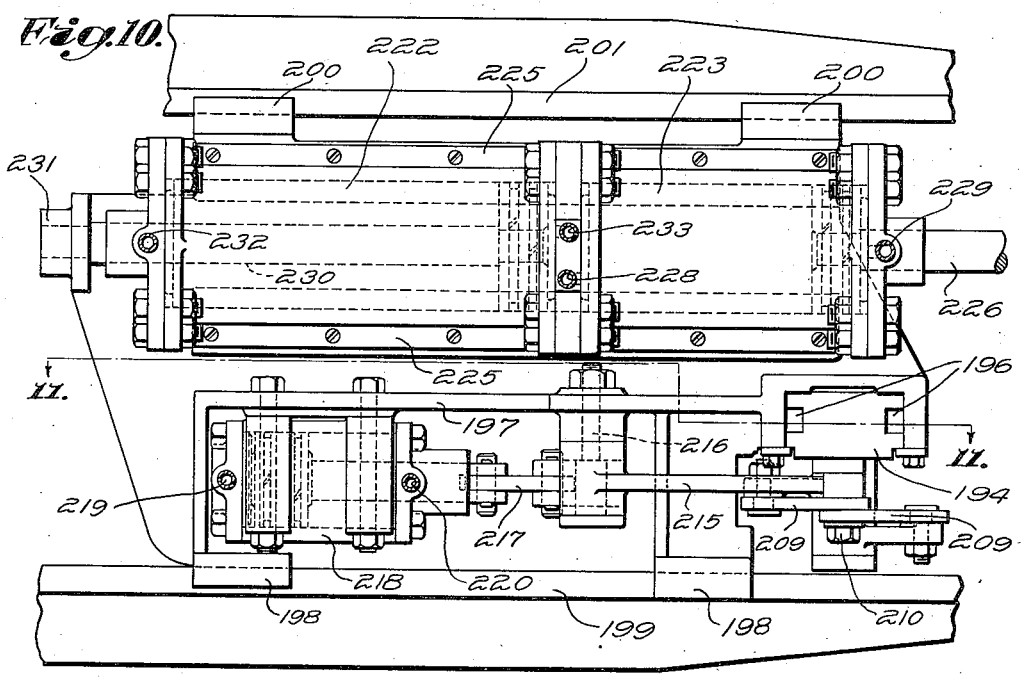
Fig. 10 is a fragmentary view in elevation of certain of the mechanism for moving and operating the tongs.

I have chosen to illustrate in my invention as embodied in a single unit type of machine somewhat similar to the single units which when grouped together form the well known commercial "Hartford-Empire I. S. machine" which is described in the Ingle Patent No. 1,911,119, granted May 23, 1933. It will be understood that as many of the individual units each as disclosed in the accompanying drawings and hereinafter to be described as desired may be mounted in some desired relationship adjacent to each other and fed from a common source of glass charges as an automatic feeder of any well known type, the several units all being synchronized in their operation with each other and with the feeder as disclosed in the Ingle patent above referred to. Inasmuch, however, as my present invention is illustrated as well by the showing of a single unit as by a multiple unit machine, the present disclosure has been limited to such a single unit.

Like the commercial "I. S. machine", each unit of my present machine is mounted upon a suitable stationary base as 1 which may be supported on the factory floor or any other suitable supports by the provision of jack screws as shown at 2, these screws serving for the purpose of supporting the weight of machine and also for leveling of the machine, as desired.

Supported on the main base 1 is a box-like structure generally indicated at 3 by which the various machine elements hereinafter to be described are supported and in and on which the various operating mechanisms are mounted, as will be hereinafter described.

The timer

I have chosen to illustrate in Fig. 4 of the accompanying drawings, a timer generally indicated at T by which each of the various working instrumentalities hereinafter to be described are operated and their operations synchronized with the operations of other instrumentalities. This timer may be substantially the same type as is used in the commercial "Hartford I. S. machine" and disclosed in the Ingle patent above referred to, the details of the timer also being set forth in prior Ingle Patents 1,843,159 and 1,843,160, both granted Feb. 2, 1932. The timer T is driven from a suitable source of power in synchronism with the feeder by which glass charges are normally supplied to the machine of my invention. A single motor is usually employed to operate both the feeder and the timer for the forming machine.

From the point of view of my present invention, the timer T may be described as comprising a valve box 4 including a plurality of valves diagrammatically illustrated at 5, each of which is independently operated and each of which communicates through a suitable pipe with a particular mechanism in the forming machine. A rotating drum 6 forming a part of the timer has on its periphery a plurality of grooves, one opposite each of the valves 5. In each of the circumferential grooves of the drum 6 a long and a short button as shown at 7 may be secured in any desired adjusted position.

The arrangement is such that when a short button engages its respective valve operating mechanism associated with its respective valve, that valve will be opened to admit pressure from the common source of supply, here indicated by the pipe 8, to the associated mechanism of the forming machine. This pressure is continuously admitted until a long button located in the same groove engages the valve operating mechanism, at which time the valve is moved to a position to cut off further flow of pressure from the common supply to the associated operating mechanism and to exhaust pressure from that mechanism. Reference may be had if desired to the Ingle patents above referred to for a more complete disclosure of the valves and their operating mechanisms.

The timer T may be mounted in a manner not shown on or adjacent to the machine of my present application or may be located at any position near this machine, there being the necessary number of pipe connections from the timer to the several operating mechanisms on the machine hereinafter to be described. It will be understood that where necessary, flexible tubing is used to permit of the movement of the operating mechanisms of the machine. Inasmuch as this piping involves no invention on my part and, if shown, would complicate the drawings, it has been omitted therefrom except to show some of the end portions of the pipes leading from the operating mechanisms.

The blank mold-mounting and operation

Adjacent to one end of the machine as shown is mounted a blank mold 9, which may be constructed in the usual manner of mating portions or halves, these portions or halves being mounted as is customary in mold holders 10 (Figs. 1 and 2). These mold holders are pivoted on a common pintle 11 (Fig. 2) which is rigidly mounted on the upper face of the box-like structure 3.

For opening and closing the blank mold, the holders 10 are connected by links 12 with the outer ends of cranks 13 which are respectively mounted on the upper ends of vertical shafts 14 and 15, journaled in the base member 3 and in lower bearings as shown at 16 (Fig. 1). Adjacent to their lower ends, the shafts 14 and 15 are provided with cranks 17 and 18 respectively (Fig. 3), which are connected by links 19 and 20 respectively with a sector 21 journaled upon a pintle 22 and having rigid therewith a crank lever 23 connected by a link 24 to the outer end of the piston rod in a pneumatic cylinder 25. Pressure may be conducted to the opposite ends of the cylinder 25 from the timer T through suitable pipes, one of which is shown at 26. Thus, when pressure is admitted to one end and exhausted at the other of the cylinder 25, the blank mold will be opened or closed respectively according as the pressure is admitted in one direction or the other to this cylinder.

Associated with the lower end of the blank mold when closed in readiness for the receipt of a charge of glass is a suitable neck ring 27 shown best at the upper end of Fig. 5. There are two such neck rings as will be hereinafter described, the neck rings being formed in suitable halves as in the usual construction. The neck ring halves are respectively supported in suitable holders as hereinafter to be described. Also included in the neck ring construction, as shown in Fig. 5, is a nipple member 28 which is unitary in character and which is always maintained in association with the neck ring halves by suitable means (not shown) even though the neck ring halves may open to some extent for the release of a blank as hereinafter to be described. When the neck ring is closed, the nipple member 28 is in the position shown in Fig. 5 to form the outer end of the lip of the neck portion of the blank. The unitary character of the nipple 28 forms a seamless lip, which is desirable in making many types of bottles, such for example as those adapted to receive the well known crown caps.

Neck pin, mounting, adjustment and operation

I have shown at 29 a neck pin which is preferably made interchangeable and which is mounted for movement into and out of cooperative relation with the neck ring in a manner somewhat similar to the corresponding mechanism of the "I. S. machine" as disclosed in Ingle Patent No. 1,911,119. In addition, however, means are provided as will be hereinafter described for moving the entire neck pin mechanism to and from a position in cooperation with the blank mold for the purpose of providing clearance for certain other operations peculiar to the present machine.

The neck pin 29 is interchangeable as above set forth and is secured to the piston rod 30 of the piston 31 by means of a pair of split collar members 32 which are provided with inwardly turned flanges engaging around outwardly extending flanges formed on the base portion of the neck pin and the upper end of the piston rod 30 respectively. The members 32 are cylindrical in their outside contour and are received at all times within suitable bores in a threaded nut member 33 and an inwardly extending cylinder head member 34 respectively, these bores being aligned and of substantially the same diameter. As shown, the piston 31 operates in a cylinder 35 to the upper end of which the inwardly extending head member 34 is secured as by bolts 36. The nut member 33 is in turn threaded into the upper end of the member 34 as shown.

The cylinder 35 itself forms the extension of a piston 37 which works in a cylinder 38, the cylinder 38 being mounted for vertical adjustment in a sleeve-like casing 39 to which it is splined by a key member 40 arranged to extend into a longitudinal groove 41 cut in the cylinder 38.

For vertically adjusting the neck pin structure as a whole for cooperation with blank molds of different heights, the entire neck pin structure including the cylinder 38 and all parts carried thereby are vertically adjusted in respect to the base 1 to which the casing 39 is secured by means of a large nut 42 which is threaded on the cylinder 38 and which rests on the upper end of the casing 39. Thus, it will be seen that rotation of the nut 42 will be effective to raise and lower the entire neck pin structure, rotation of the neck pin structure being prevented by the spline or key 40. Gravity is depended upon for lowering the neck pin structure when the nut member 42 is rotated to permit this action.

For rotating the nut member 42, the outside periphery thereof is provided with gear teeth 43, Figs. 1, 3 and 5, with which meshes a pinion 44 mounted on a vertical shaft 45 which extends upward to a point where its upper end may be engaged by a suitable tool for turning it to adjust the neck pin structure vertically. It will be understood that the shaft 45 is suitably journaled in bearings fixed in respect to the machine, including the bearing 46 (Fig. 1), which may be secured to or formed as a part of the casing 39.

For moving the neck pin and its associated mechanism to and from its general operative position in order to move it out of the way to clear other parts during certain operations, pneumatic pressure connections are provided for the cylinder 38 as the pipes 47 and 48 communicating with the upper and lower ends respectively of the cylinder 38. The pipe 48 passes through a suitable slot 49 formed in the side wall of the casing 39 to permit of the vertical adjustment of the cylinder 38 as aforesaid.

For moving the neck pin, means are provided for moving the piston 31 in the cylinder 35. For this purpose a compression spring 50 is arranged between the lower end of the inturned head 34 and the upper side of the piston 31, the spring at all times tending to move the neck pin out of its cooperative position in respect to the neck ring 27. Pneumatic pressure may be supplied for moving the neck pin into its uppermost or operative position when the piston 37 is at the uppermost end of its travel in cylinder 38. For this purpose, pressure is conducted from the timer T through the pipe 51 to a port in the upper end of the cylinder 38 which is opposite a port and passage indicated at dotted lines at 52 at the uppermost position of the piston 37 in its cylinder, the passage 52 communicating with the lower end of cylinder 35.

The piston rod 30 associated with the piston 31 has a portion 53 projecting downwardly through the lower head 54 of the cylinder 35 and into a well formed in this head. This well is normally closed but is vented through a passage shown at 55 to a transversely extending exhaust passage 56 which in the uppermost position of the piston 37 in its cylinder is open to the atmosphere at its outer end.

When the neck pin 29 has been withdrawn by downward movement of the piston 31 in its cylinder, it is desired to supply counterblowing pressure around the neck pin to counterblow the glass in the usual manner. For this purpose, the neck pin structure is provided with lateral and longitudinal bores, as indicated at 57, which communicate with a longitudinal bore 58 extending through the piston rod 30, the piston 31 and the extension 53 thereof as shown. The bore 58 communicates at the uppermost or operative position of the neck pin 29 through a laterally extending port 59 with an annular groove 60 formed in the head 54, which in turn communicates through the exhaust passage 56 with the atmosphere. At the lowermost position of the neck pin at which counterblowing is desired to be effected, the lateral port 59 is opposite an annular groove 61 in the head 54 which in turn communicates through offset passages with a port 62, which at the uppermost position of the piston 37 in cylinder 38 is opposite a port 63 communicating with the timer T through a pipe 64. Thus, counterblowing pressure may be supplied to the interior of the glass only when the parts are in the proper position for counterblowing.

*The funnel, mounting and operation*

Referring to Figs. 1, 2, and 6, there is illustrated above the blank mold 9 a funnel member 65 which is arranged, when the blank blow is in closed position, to seat in a substantially air tight manner on the upper end of the blank mold 9. The funnel 65 is mounted in a corresponding manner to that employed in the "I. S. machine" disclosed in the Ingle Patent No. 1,911,119 on the outer end of an arm 66 in which it is preferably loosely received. The arm 66 is vertically adjustably secured to a vertical shaft 67 (Figs. 1, 2 and 3) which forms the piston rod of a pneumatic cylinder 68. The cylinder 68 is suitably secured to the base member 3.

As shown, the operation in this cylinder may be somewhat similar to the operation in cylinder 35 (Fig. 5), except that upward movement of the piston therein is preferably occasioned by a suitable spring indicated at 69 (Fig. 3) while downward movement may be caused by the admission of pressure to the upper end of the cylinder 68 from the timer T. The funnel may thus be moved vertically in respect to the blank mold 9 to and from its operative position.

In addition, it is desired that the funnel be moved laterally when approaching its inoperative position, preferably in a counterclockwise direction as seen in Fig. 2. For this purpose, the well known twist cam mechanism is preferably employed as by providing the vertical shaft 67 with a cam roller cooperating with a cam track formed in a stationary member substantially concentric with the piston rod, the arrangement being such that the initial part of the movement starting from the operative position of the funnel will be vertical, followed by a helical movement of the funnel due to an angular portion of the cam track. The cam is not shown in the accompanying drawings, but the construction will be understood to be substantially the same as that which is fully illustrated and described in the Ingle Patent No. 1,911,119, above referred to.

*Settle plunger and settle blow mechanism, construction, mounting and operation*

While I contemplate that any desired and/or known means may be used for forming the blanks in the blank mold, and particularly for settling such blanks, I have shown in the accompanying drawings a plunger settle arrangement of the type generally shown and described in the patent to Rowe No. 1,945,983, granted Feb. 6, 1934. This includes the plunger shown at 70 in Figs. 1 and 6 which is mounted as hereinafter described in a holder generally indicated at 71, this holder in turn being mounted on a laterally extending arm 72, which is vertically adjustably secured to a vertical shaft 73, the latter forming the piston rod of a piston within a vertically arranged pneumatic cylinder 74. The cylinder 74 is secured to a suitable bracket 75 which is in turn secured to the end vertical face of the box-like base member 3.

For moving the plunger 70 vertically, pressure may be supplied to the opposite ends of the cylinder 74 from the timer T through the pipes 76 and 77, thus moving the piston in this cylinder vertically and this in turn moving the plunger 70.

It is desired that the plunger 70 be moved laterally in moving it to its inoperative position. For this purpose a twist cam of the well known type is employed cooperating with a roller indicated in dotted lines at 78, Fig. 1, and secured by a bracket 79 to a downward extension of the piston rod or shaft 73. Cam roller 78 works in a groove shown at 80 (Figs. 1 and 3), this groove being vertical at its lower portion to cause the movement of the plunger 70 in its lowermost portion to be vertical and being substantially helical in its upper portion to cause the plunger to move laterally after it has been moved vertically sufficiently to clear the blank mold 9 and funnel 65.

For vertically adjusting the plunger 70 to cooperate with molds of different heights, the arm 72 is made vertically adjustable in respect to the shaft 73. As shown, this arm may be clamped to the shaft 73 by a clamping member 81 and bolts 82 in any desired adjusted position. When these bolts are loosened, the arm 72 may be vertically adjusted by rotating a bolt 83 which is threaded into the arm 72 and is swivelly mounted in a laterally extending bracket 84 secured to the upper end of the shaft 73. The bolt 83 is provided above the bracket 84 with a suitable nut which may be engaged by a wrench or other tool for vertically adjusting the arm 72. It will be understood that after the adjustment has been made by rotation of the bolt 83, the bolts 82 are tightened to lock the arm 72 in a desired adjusted position.

Turning now to Fig. 6 in which the detailed construction of the head 71 and its connection with the plunger 70 are shown, it will be seen that the head 71 is secured to the arm 72 by a nut and bolt arrangement generally indicated 85. The construction is such that should it be desired to change the head, the nut may be removed and the bolt retained in its normal position by a small pin indicated in dotted lines at 86.

The head 71 in detail comprises a bracket extension 87 which is secured to the arm 72 by the bolt 85 as above described and is provided at its outer end with a split collar, the ends of which are clamped together by means of a locking bolt 88 to engage around a main head member 89. The member 89 is formed as shown with a vertical aperture therethrough and bearing portions at its center of different sizes. Through the member 89 passes an internal sleeve-like member 90 which has a longitudinal bore 91 therethrough stopped at the top by a plug 92. Threaded into the lower end of the member 90 is a tube 93 through which cooling air may pass to a point adjacent to the lower end of the hollow plunger 70. The lower end of the member 90 is externally threaded and screwed into the internally threaded upper end of the plunger 70. In order to facilitate the assembly of the parts, the plunger 70 is provided at one side with a notch 94 which is adapted to engage a fixed pin 95 secured in an inwardly extending flange of the member 89. Thus in assembling the parts, the tube 93 is first threaded into the member 90 and the plug 92 also threaded into this member to close the upper end of the bore 91. The main plunger member 70 is then placed in position, as shown in Fig. 6, and the member 90 inserted through the upper end of the member 89 and rotated by a nut at its upper end to thread it into the plunger member 70, the latter being prevented from rotating by the pin 95 and notch 94.

In view of the fact that air pressure is preferably employed in conjunction with the mechanical pressing action of the plunger 70, it is desired that the joint between the member generally indicated at 71 and the upper side of the funnel 65 be made as tight as possible. For this purpose, a sleeve member 96 is provided, the lower end of which bears against the upper surface of the funnel and is spring pressed into good contact therewith by a compression spring 97 extending between the under side of the head 71 and an outwardly extending flange at the lower end of the member 96.

At the desired time, pneumatic pressure may be supplied from the timer T to accomplish two purposes, first, to cool the plunger, and, second to supply settle blowing pressure to compact the glass in conjunction with the mechanical pressing section of the plunger 70. This pressure is conducted to the head 71 through a pipe 98 and passes thence through registering bores 99 and 100 to an annular groove 101 formed in the upper end of the member 89 around the member 90. Pressure thence passes through one or more bores 102 to the longitudinal bore 91 and thence through the pipe 93 to the lower end of the hollow plunger 70. The pressure thence passes back between the pipe 93 and the inside of the hollow plunger 70 in the space 103 to an annular groove 104 formed around the pipe 93 adjacent to the upper end of the plunger 70 and below the lower end of the member 90. Pressure then passes through one or more lateral bores 105 to the interior of the head around the plunger which communicates as shown at 106 with the space within the funnel around the plunger 70 and this space in turn communicates with the interior of the mold 9. In this way, the same pressure which cools the funnel is effective thereafter in settling the glass, thus tending to form a more uniform and better compacted hollow ended blank.

*The counterblow baffle, mounting and operation*

Subsequent to the settling of the charge as aforesaid the settle plunger 70 is moved to its inoperative position, after which the funnel 65 is moved to its inoperative position and a counterblow baffle is moved to a position to seal the upper end of the blank mold 9. This counterblow baffle is indicated diagrammatically in Fig. 2 at 107 and may be substantially the same construction as the corresponding member used in the "Hartford I. S. machine", as disclosed in Ingle Patent No. 1,911,119, except that it need not be provided with means for supplying settle blowing pressure as in the case of the counterblow baffle used in the "I. S. machine". This baffle as shown in the accompanying drawings is mounted on the outer end of an arm 108 extending laterally from a vertical shaft 109 to which it is vertically adjustably secured, as in the usual manner. The shaft 109 forms the piston rod of a pneumatic cylinder 110 (Fig. 3) which corresponds to the pneumatic cylinder 68 for operating the funnel. The cylinder 110 is suitably secured to the base member 3 and is provided with substantially the same type of means for moving the baffle vertically and laterally as cylinder 68, the latter movement preferably being accomplished by a twist cam (not shown) in response to the vertical movement of the piston in the cylinder. As in the case of the funnel moving means, upward movement of the baffle may be accomplished by a compression spring indicated at 111 while downward movement may be caused by the admission of pressure to the upper end of the cylinder 110 under the control of the timer T. Inasmuch as these movements are substantially the same as the "Hartford I. S. machine", no further description thereof will be given.

*The neck rings, mounting and operating means therefor*

The neck rings, which are shown individually at 27 in Fig. 5, are mounted in substantially diametrically opposed pairs of holders 112 (Fig. 1) which holders are arranged for unidirectional 180° steps of movement about a transversely extending substantially horizontal axis (shown as the axis of the trunnion 113), which axis is disposed intermediate the blank and blow mold positions. The general disposition of each of the neck rings in respect to the axis of the trunnions 113 is substantially the same as the corresponding parts in the "Hartford I. S. machine" except that in the "I. S. machine" there is but one neck ring and the neck ring is rotated through 180° in transferring a blank from the blank mold to the blow mold, then is caused to release the blank, then returns by a movement in the opposite direction to a position in cooperation with the blank mold. In my present machine on the other hand, the neck ring rotating means usable for inverting and simultaneously transferring blanks from the blank mold in the direction of the blow mold, always moves in one and the same direction, there being two neck rings, so that when one has been moved through an angle of 180° to invert and transfer a blank from the blank mold to the first reheating position later to be described, the other neck ring has been moved concomitantly to a position to cooperate with the blank mold. The neck rings thus cooperate alternately with the blank mold in forming blanks therein.

In order to accomplish these several operations, means must be provided for individually opening and closing the neck rings. Means must always be provided for rotating the neck ring carrying structure or moving support in intermittent steps of movement each of 180°. Means are also preferably provided for permitting the necessary vertical adjustments of the neck rings for compensating for molds of different heights as in the "I. S. machine". Inasmuch as these neck rings and the operating mechanism for opening and closing them are exactly similar each to the other, only one will be described.

The neck ring holders 112 (Fig. 7) are formed on the ends of outwardly extending arms 114 (Fig. 1), the inner ends of which are up-turned to form foot members, which are arranged for vertical adjustment in respect to guideways 115, the arms 114 and their foot members being secured in vertically adjusted position to these guideways as by bolts 116. The guideways 115 are formed on suitably shaped parts extending from a pair of opposed movable pneumatic cylinders 117 which are arranged for endwise movement on a relatively stationary piston rod 118. The ends of the piston rod 118 are rigidly secured in hub portions 119 of cup like members 120. The hub portions 119 are in turn rigidly secured in the rotatable supporting member 121 which is provided with the trunnions 113 journaled in suitable bearings in brackets 122 and 123 respectively, these brackets being secured to portions of the main frame member 3 as shown by the bolts 124.

Located between the opposed cylinder members 117 and secured to the relatively stationary shaft 118 is a relatively stationary piston member 125, this piston member being prevented from rotation about the shaft 118 preferably by a transverse pin 126 (Fig. 7). Means are provided for preventing relative rotation between the cylinder members 117 and the shaft 118. In this instance, these means comprise a key 127 which is secured to the piston member 125 by bolts 128 and which has laterally extending portions slidably fitting into suitable grooves in the cylinder members 117. A dust shield 129 may be secured to the member 127 to overlie the edges of the portions forming the grooves in the cylinder members 117 and the key 127, this dust shield being secured to the member 127 by bolts 130.

Means are provided for moving the cylinder members 117 toward and from each other for independently closing and opening the neck rings. In this instance the closing means is shown as a pair of compression springs 131, one for each of the cylinders 117 and located between the cups 120 and the cylinders 117 as shown. When it is desired to open the neck rings, which is only desired at the position thereof spaced from the blank mold position, or as it may be termed, the first reheating position, pressure may be supplied from the timer T to the space between the relatively fixed piston 125 and the cylinders 117. For this purpose pressure is conducted from the timer through pipe 132 and registering ports 133 and 134 in the trunnion 113 to the mechanism associated with the neck ring at the first reheating position. It will be noted that the port 134 associated with the other neck ring is open to exhaust to the atmosphere at this time through a port shown in dotted lines at 135. The port 134 communicates through the passages or bores 136 and 137 with the space between piston 125 and the cylinder 117 to the left, as seen in Fig. 7, and that space in turn communicates through a bore 138 in the piston 125 with the corresponding space between the piston 125 and the cylinder 117 at the right as seen in that figure.

The operation of the neck ring opening and closing will now be obvious. Each ring may only be opened at the first reheating position for the release of a blank at this position, opening being accomplished by the supplying of pressure from the timer through the pipe 132, and closing of the neck ring being subsequently accomplished by the exhausting of this pressure and under the action of springs 131.

Means are provided for rotating the movable support by which the neck rings are carried and which has just been described. For this purpose the member 121 shown in Fig. 7 has secured thereto a sprocket 139 which is connected by a sprocket chain 140 with a sprocket wheel 141 mounted on a shaft 142, Figs. 1, 8 and 9.

Referring now to Figs. 8 and 9, the shaft 142 is suitably journaled in bearings 143 and 144 in a bracket 145 which is secured to the base 1 of the machine. A bearing 144 is formed not directly in the bracket, but in a sleeve member 146 which is fast with the bracket and is received in a suitable aperture or supporting portion therein. Splined on the shaft 142 as by a spline or key 147 is a large gear wheel 148 which is arranged for alternate meshing engagements with upper and lower racks 149 and 150, these racks being suitably mounted in an oscillating frame generally indicated at 151. As shown, the rack 150 is formed as an integral part of the frame 151 although this is not necessary. The rack 149 is, however, shown as a separate part and is longitudinally adjustable in respect to the frame primarily as a set-up adjustment. This longitudinal adjustment may be effected by a pair of jack screws 152 threaded through the end portions of the frame and bearing against the ends of the rack 149, the screws being suitably locked in adjusted positions by the jam nuts 153. Once the adjustment has been made, the rack 149 is preferably locked in respect to the frame 151 by a plurality of bolts 154 which pass through elongated holes in the frame and are threaded into the rack 149 as shown.

For oscillating the frame 151, one end is connected by a bracket 155 with a piston rod 156 extending from a pneumatic cylinder 157. Pressure is conducted to the opposite ends of the cylinder 157 through the pipes 158 and 159 as hereinafter described. As shown, the cylinder 157 is formed as a part of the bracket 145 although it will be understood that this cylinder may be located in any suitable fixed position.

The gear 148 is mounted for endwise movement as above generally set forth on the end of a hollow piston rod 160, which is sleeved about the shaft 142 and is constrained to rotate therewith by the spline or key 147. The piston rod 160 carries a piston 161 which is arranged for movement in a cylinder 162 formed by a portion of or rigid with the member 146 and including a cylinder head 163 which is suitably secured thereto. Pressure may be conducted to the opposite ends of cylinder 162 from the timer through pipe 164 and passage 165 to the right hand end of the cylinder, as seen in Fig. 8, and pipe 166 and passage 167 to the left hand end of this cylinder, as seen in this same figure.

The hollow piston rod 160 is further provided with a transverse bore 168 which in the position of the parts shown in Fig. 8 is in alignment with a port and passage generally indicated at 169, Fig. 8, this passage in turn continuously communicating through suitable bores, a circumferential groove 169ª and a pipe indicated diagrammatically at 170 with one end of the interior of a valve casing generally indicated at 171. The shaft 142 is also provided with a series of bores or passages 172 which communicate through a pipe diagrammatically illustrated at 173 with the opposite end of the interior of the valve casing 171. The valve casing 171 contains a piston valve including two terminal heads 174 and 175 and an intermediate head 176 all connected together for common movement under the control of pressure through the pipes 170 or 173. Communicating with one side of the valve casing is a pipe 177 connected to a constant source of pneumatic pressure and pipes 158 and 159 communicating with the opposite ends of cylinder 157 as indicated by comparison of Figs. 8 and 9, the ends of pipes 158 and 159 on these two figures being shown opposite each other to indicate such communication. The valve casing 171 is also provided with a pair of needle valve controlled exhaust ports 178 and 179.

The mechanism above described for rotating the neck rings operates as follows, starting with the parts in the position shown in Figs. 8 and 9. At these positions, the first action which must take place is the endwise movement of the gear 148 from a position in cooperation with rack 150 to a position in cooperation with rack 149. This is accomplished by the admission of pressure from the timer T through pipe 164. The first action effected by this is the movement of the gear to the left as seen in Fig. 8 which causes the port 168 to move out of alignment with the passage 169 and thus cuts off exhaust from the left hand end of the valve casing 171 through pipe 170. However, in view of the relatively large capacity of the pipe 170 as compared with the amount of air which must be displaced by movement of the valve head 174 to the left hand end of the valve casing, as seen in Fig. 8, this action may be permitted when pressure is supplied through pipe 173. This action is further permitted by leakage from pipe 170 along the shaft 142, which is inevitably present. The same action might specifically be provided for by making a very small bleed opening in pipe 170.

In the position of the valve as shown in Fig. 8, pressure may pass from pipe 177 through the valve casing between heads 176 and 174 to pipe 158 and thence to the left hand end as seen in Fig. 9 of the cylinder 157, thus retaining the piston in this cylinder in the position shown.

The next operation, once the gear 148 has been shifted substantially to the limit of its travel into engagement with rack 149 is that the port communicating with passage 172 is uncovered by the movement of the piston 161. Pressure then passes from pipe 164 and passage 165 and the interior of cylinder 162 to the right of piston 161 through passage 172 and pipe 173 to the valve 171 to move the piston therein to the left. This cuts off further flow of pressure through the pipe 158 to the left hand end of cylinder 157 as seen in Fig. 9 and admits pressure from pipe 177 to the valve between heads 176 and 175 and thence through pipe 159 to the right hand end of cylinder 157, as seen in Fig. 9, the left hand end of the cylinder being simultaneously open to exhaust through the exhaust port 178 of valve 171. As will be obvious, this can only be accomplished after the gear 148 has reached the limit of its axial travel and is in mesh with rack 149. The piston in cylinder 157 is then moved to the left as seen in Fig. 9 which in turn moves the frame 151 to the left and causes the gear 148 and sprocket 141 to rotate through an angle of 180°, which will cause 180° rotation of the neck ring carrying structure. It will be understood that the rotation of the shaft 142 need not be 180° if the ratio of the sprockets 141 and 139 is suitably changed, the purpose being to rotate the neck ring carrying structure through 180° irrespective of the angle of rotation of the shaft 142.

When it is desired again to move the neck rings through an angle of 180°, pressure is supplied from the timer through the pipe 166 and passage 167 to the left hand end and pressure exhausted through pipe 164 and passage 165 from the right hand end, as seen in Fig. 8, of the cylinder 162. The rotation of the gear 148 and shaft 142 as above set forth will have moved these parts through an angle of 180°. This will move the passage 172 out of alignment with the port communicating with pipe 173. Pressure in pipe 173 may exhaust gradually at this time along the bearing between the shaft 142 and the stationary bearing member 146. This may also be accomplished by providing a very small bleed opening in pipe 173. However, as no pressure is transmitted through the pipe 170 at this time, the piston in valve 171 will not move. At the completion of the movement of the piston 161 and gear 148 to the right, so that the gear is moved into mesh with rack 150, the port 168 is again brought into alignment with the passage 169, so that pressure from the inside of the cylinder 162 at the left of the piston 161 therein may now pass through port 168, passage 169, 180° around groove 169ª and pipe 170 to the left hand end of valve casing 171 to move the piston therein to the right, that is to the position shown in Fig. 8. This results in the reversal of pressure to the cylinder 157 by permitting pressure to flow from pipe 177 through the valve between heads 176 and 174 and pipe 158 to the left hand end, as seen in Fig. 9 of cylinder 157, the opposite end of the cylinder being exhausted through the valve. This completes the cycle of the apparatus just described and brings the parts back to the position shown in Figs. 8 and 9.

*Bottom support at first reheating position mounting and operation*

I preferably provide at the first reheating position, that is, the position to which the neck rings move the blanks, a support for the bottom portions of such blanks to control the elongation thereof while they are reheating in this position. As shown in Fig. 1, this bottom support may be formed as a bottom plate 180, this bottom plate being preferably interchangeably mounted in the end of an arm 181, Fig. 2, so that bottom plates of the desired type and/or size may be used. The arm 181 is pivoted on a horizontal axis 182 to a bracket 183 which is clamped in a desired vertically adjusted position to a vertical shaft 184 which is in turn mounted rigidly in a bracket 185 (Fig. 3), the bracket 185 being suitably secured to one side wall of the base member 3.

Means are provided for moving the arm 181 and the bottom plate 180 about the axis of the pintle 182 to move it to and from its operative or substantially horizontal position. As shown, the arm 181 is provided with an extension 186 on the opposite side of the pintle 182, which is connected by a link 187 with a suitable bracket 188 extending laterally from and vertically adjustably secured to a rod 189, which may be the piston rod of a pneumatic cylinder 190. The cylinder 190 is preferably formed integral or rigid with the bracket 185 as shown in Figs. 1 to 3. Pressure may be conducted to the opposite ends of the cylinder 190 from the timer T. Thus by suitable application of pressure to the opposite ends of the cylinder 190, the shaft 189 will be vertically moved, which in turn will operate through the link 187 to move the bottom plate 180 to and from its operative position. The vertical adjustment of the bracket 183 on the shaft 184 and of the bracket 188 on the shaft 189 are both provided for the purpose of permitting the bottom plate structure and its operating means to be suitably adjusted to compensate for the making of blanks of different lengths.

*Tongs transfer means, construction, mounting and operation*

While under certain circumstances, I contemplate that the neck rings may be used as the sole transfer means by transferring blanks from the blank mold to the blow mold or for transferring blanks to some position to which the blow mold may be moved to close about the blanks, I have shown in the present drawings and contemplate as a part of my complete invention that tongs be used for transferring the blanks from the delivery position of the neck rings to the blow mold. Also, from a broad point of view, this transfer by the tongs may be effected by a single uninterrupted movement. However, I have shown for purposes of illustration an arrangement by which blanks are transferred from the first reheating position or delivery position of the neck rings to a second reheating position and thence to a position at which the blow mold may be closed about the blanks.

Figure 11:
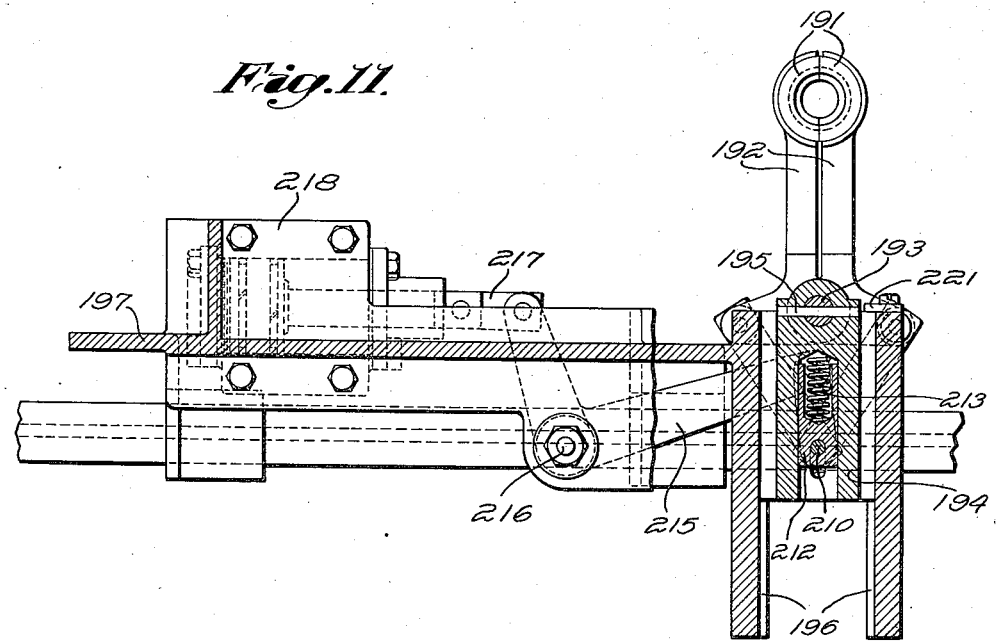
Fig. 11 is a view of the tongs operating means taken substantially on the line 11—11 of Fig. 10.

Turning now to the accompanying drawings, and particularly Figs. 1, 2, 10, 11 and 12 thereof, I have shown at 191 a pair of cooperating tongs. These tongs are mounted or formed on the outer ends of arms 192 which are pivoted on a common pintle 193 as best seen in Figs. 11 and 12, the hubs of the arms 192 being arranged one above the other on the pintle as shown in Fig. 12. The pintle 193 is secured in a slide member 194 by a pin 195. The slide member 194 is arranged for transverse sliding movement in a pair of guideways 196 formed in a longitudinal sliding carrier 197. The carrier 197 is mounted in suitable stationary guideways on the machine and for this purpose has a pair of shoes 198 engaging a lower guide rail 199 and another pair of shoes 200 engaging an upper guide rail 201.

The guide rails 199 and 201 form the horizontal members of a stationary but vertically adjustable frame work including members 202 at the left and 203 at the right, as seen in Fig. 1. The member 202 is provided as best shown in Fig. 12 with a pair of projecting bracket members 204 which may be vertically adjustably secured to a stationary column 205 which is in turn secured to the base member 1 or 3 by one or more bracket members as shown at 206, Fig. 3. The brackets 204 are secured in adjusted position to the column 205 by suitable clamping bolts 207. The vertical frame member 203 is formed with a pair of guide members 208 (Fig. 2), engaging around a complementary shaped portion of the bracket 122. Suitable means (not shown) may be provided for clamping the member 203 to the bracket member 122 in a desired vertically adjusted position. Thus the tongs and their operating means hereinafter to be described may be vertically adjusted to compensate for the making of ware of different heights.

Means are provided for opening and closing the tongs. As shown in the accompanying drawings, Fig. 11, the tong arms 192 are formed substantially as bell cranks and have connected thereto links 209, Figs. 10 and 12, which are connected to a common pintle 210. The pintle 210 passes through an elongate aperture 211 in the slide member 194 and is rigidly connected to a slide 212 which works in a bore in the slide member 194, the slide 212 being urged to the left with respect to the slide 194 as seen in Fig. 12, by a compression spring 213. The pintle 210 is further connected by a link 214 with one arm of a bell crank lever 215 which is pivoted intermediate its ends at 216 to the carriage 197, as seen in Figs. 1 and 11. The other arm of the bell crank 215 is connected by a link 217 to the piston rod of a pneumatic cylinder 218 (Figs. 1 and 11) which is secured to the carriage 197. Pressure may be conducted to the opposite ends of the cylinder 218 from the timer T for opening and closing the tongs.

The operation of the tongs opening and closing means is as follows. Assuming the parts to be in the position shown in Figs. 10, 11 and 12 with the tongs closed, pressure is conducted from the timer through the pipe 219 to the left hand end of the cylinder 218 as seen in Fig. 10. This forces the piston to the right in this cylinder causing the clockwise movement of the bell crank 215 as seen in Fig. 11. This will cause the movement of the pintle 210 to the left as seen in Fig. 12. The spring 213 expands upon this movement to cause the pintle 210 to move to the left hand end of slot 211 before the slide member 194 is moved. During this movement, the tongs are opened due to the relative movement between pintle 210 and pintle 193, the former of these pintles being connected through the links 209 with the tongs arms. Once the pintle 210 has engaged against the left hand end of the slot 211, the tongs and slide member 194 are simultaneously moved to the left, as seen in Fig. 12, without any further opening movement of the tongs, thus moving them to an inoperative position. This action occurs when the tongs are releasing a blank which has been enclosed by the blow mold.

In closing the tongs, exactly the reverse series of operations occurs, pressure being admitted through the pipe 220 to the right hand end as seen in Fig. 10 of cylinder 218. This causes a counter-clockwise movement of the bell crank 215 which causes the slide 194 and tongs to move together to the right as seen in Fig. 12, the spring 213 preventing the closing of the tongs during this movement. Once the slide 194 has engaged against a stop shown at 221 in Fig. 11, this slide can move no further and continued movement of the bell crank 215 causes a relative movement between the pintles 210 and 193 to close the tongs, compressing the spring 213 during this movement. This operation occurs when it is desired that the tongs grasp an article at the first reheating position and to be released by a neck ring at this position. It will be understood that the tongs engage the article immediately below the neck ring.

Means are provided for moving the tongs in the two-step movement, first, from the first reheating position or receiving position for blanks by the tongs to the intermediate or second reheating position, and, second, from the last named position to the blow mold position. For this purpose, I have provided a pair of aligned fluid pressure cylinders 222 and 223. These cylinders are rigid one with the other and are arranged for sliding movement on the carriage 197. For this purpose, the cylinders are provided with guide members as shown at 224 (Fig. 12) which are received and held in suitable guideways by the members 225, the latter being secured to the carriage 197. The cylinder 223 has associated therewith a piston carried by a fixed piston rod 226, the outer or right hand end of which as seen in Fig. 1 is secured to the member 203 at 227. The cylinder 223 may be supplied with fluid pressure from the timer through pipes 228 and 229. Thus at the position of the parts shown in Figs. 1 and 10 with the piston at the right hand end of cylinder 223, the tongs are at their intermediate position, so that a blank held therein will be at the second reheating position.

Cylinder 222 has a piston rod 230 which is connected at its outer or left hand end at 231 with the slide carriage 197. Pressure may be conducted to the opposite ends of cylinder 222 through pipes 232 and 233.

When it is desired, for example, to move the tongs from their intermediate position shown in the drawings to the blow mold position, pressure is supplied from the timer through pipe 233 and exhausted through the pipe 232 both of the cylinder 222. This moves the carriage 197 to the left as seen in Figs. 1 and 10 without movement of the cylinders 222 or 223. Reverse application of pressure through pipes 232 and 233 will return the tongs to their intermediate position. This will move them part way back toward their position for grasping the next succeeding blank. The remainder of this movement is caused by admitting pressure through pipe 229 and exhausting it through pipe 228 both of cylinder 223. This causes movement of the carriage 197 and the cylinders 222 and 223 together to the right as seen in Figs. 1 and 10 carrying the tongs to their extreme right hand position at which they may grasp the next succeeding blank. The tongs may then be moved from the first to the second reheating position of the blanks by the reversal of pressure through pipes 228 and 229 under the control of the timer.

*Elongation controlling mechanism at the second reheating position*

At the second reheating position, that is the intermediate position of the tongs, I preferably provide a bottom supporting plate for controlling the elongation of blanks reheating at this position. Due to the fact that blanks by this time have already reheated to some extent and hence tend to elongate, and due to the fact that this elongation is desired up to a certain extent and under a definite control, I provide not only for supporting the blanks but for lowering the support to follow and control the elongation of the blanks according to a predetermined desired rate of elongation.

For accomplishing the above mentioned purpose, there is provided as illustrated in Figs. 1 and 2, an elongation controlling bottom plate 234 which is mounted upon a stem 235, the stem being in turn vertically adjustably secured to the end of an arm 236 which is carried by a slide member 237 arranged for movement in vertical guides 238, the guides being secured to the frame member 3 of the apparatus. The vertical adjustment of the bottom plate 234 with respect to the arm 236 provides for the accommodation of the device to the making of articles of different types and lengths. It also provides for the interchangeability of bottom plates in making differently shaped articles.

For moving the slide 237 vertically, it is connected by a link 239 with an arm 240 which is pivoted about a shaft 241 secured in a suitable bracket to the frame member 3 or some part rigid therewith, there being a second arm 242 rigid or integral with the arm 240 and carrying at its outer end a cam roller 243 engaged against the periphery of a cam 244. The cam 244 is secured to a transversely extending shaft carrying intermediate its bearings a pinion 245 which meshes with a rack 246. The rack 246 is mounted in suitable guides and is rigid or integral with the piston working a pneumatic cylinder 247 to the opposite ends of which pressure may be supplied from the timer T. Thus, when the piston in cylinder 247 is moved in one direction or the other, the cam 244 will be rotated through the intermeshing rack 246 and pinion 245 which will rock levers 242 and 240 to move the slide 237 vertically and hence move the bottom plate 234 according to a predetermined design depending upon the configuration of the cam 244. By properly designing the cam 244, a desired movement thus can be given to the bottom plate 234 for controlling the elongation of blanks at the second reheating position.

*The blow mold, mounting and operation*

I have shown at 248 a blow mold of the usual type which may be mounted as in the "I. S. machine" by supporting it in suitable holders 249 pivoted on a common pintle 250, the pintle being suitably supported in the top plate of the base member 3.

For opening and closing the blow mold at the desired times, mechanism may be provided similar to that used in the commercial "Hartford I. S. machine". In this instance the mechanism includes links 251 connecting the blow mold holders with cranks 252 which are secured to the upper ends of shafts 253 journaled in suitable bearings in or rigid with the base members 1 and 3. Adjacent to their lower ends, the shafts 253 carry cranks 254 (Fig. 3) which are connected by links 255 with a rocker member 256 pivoted about a stub shaft 257. The rocker member 256 has rigidly secured thereto a crank 258 which is connected by a link 259 with the piston rod of a pneumatic cylinder 260, the cylinder being secured to the base member 1. Pressure may be conducted from the timer to the opposite ends of the cylinder 260 for opening and closing the blow molds through the mechanism described at the desired times.

*The final blow mold bottom plate*

As shown in Figs. 1 and 13, there is provided a bottom plate 261 for the final blow mold, this bottom plate being interchangeably mounted upon a support 262 and clamped in position thereto by a suitable clamping means controlled by a handle 263. The support 262 is pivoted on a horizontal pintle 264 in a supporting bracket 265. This bracket is formed as a part of a vertically adjustable bracket which may be mounted as shown in guideways 266 (Fig. 1) and adjusted vertically by any suitable adjusting means (not shown). It is desired after the final blow has been opened and a completed article normally removed by the handling means hereinafter to be described, that the bottom plate 261 be tilted for the purpose of dumping therefrom any glass remaining thereon, so as to prepare the parts for the next succeeding blank. For tilting the bottom plate the support 262 is provided on the opposite side of the pintle 264 with a lever 267 which is connected by a link 268 with the piston rod of a pneumatic cylinder 269. Pressure may be conducted to the opposite ends of the cylinder 269 from the timer T. A suitable adjusting stop screw 270 may be threaded through the lower head of the cylinder 269 for predetermining the lowermost position of the piston therein and hence the operative position of the bottom plate 261. This adjustment is normally used merely as a set-up adjustment.

*Final blow head, mounting and operation*

I have shown diagrammatically at 271 (Fig. 2), a final blow head which may be of any conventional design and which is preferably carried by an arm 272 extending laterally from a vertical shaft 273, which may be the piston rod of a pneumatic cylinder 274. Pressure may be conducted to the opposite ends of the cylinder 274 from the timer T in the well known manner. Means including a twist cam may be provided similar to those previously described herein and similar to that used in connection with the "Hartford I. S. machine" for imparting a lateral movement to the blow head subsequent to its initial vertical movement away from the blow mold and in response to further vertical movement of the shaft 273. Inasmuch as this construction is well known in the art and similar mechanism has been explained above, it has not been thought necessary clearly to illustrate it or to give any further description of it.

*The takeout tongs*

For removing completed articles from the final blow mold, I have shown takeout tongs 275 (Fig. 1), these tongs being mounted in a suitable tongs operating head generally indicated at 276 which is pivotally carried by a laterally extending arm 277, the latter being arranged for pivotal movement about a horizontal pintle 278. The pintle 278 is supported at the upper end of a bracket 279 which is carried by a cylinder 280. The cylinder 280 is mounted for vertical adjustive movement with respect to the frame 3 in guides 281.

Suitable means may be provided for vertically adjusting this cylinder with respect to the frame and base of the machine. For this purpose there is illustrated a screw shaft 282, which is swivelly mounted at 283 in a bracket 284 secured to the base 1 and which is threaded through a lug 285 rigid with the cylinder 280. The upper end of the screw 282 is squared for engagement by a suitable tool by which the screw may be rotated for vertically adjusting the cylinder 280 and tongs carried thereby. Suitable means (not shown) may be provided if desired for securing the cylinder in a desired adjusted position on the base of the machine.

The operation of the tongs 275 per se in opening and closing form no part of the present invention and may be assumed to be conventional. Preferably this is accomplished by an arrangement which is well known in the art, including the spring 286 tending at all times to close the tongs and a suitable pneumatic pressure motor in the head 276 controlled by the timer T for opening the tongs when desired.

Means are also provided for retaining the tongs 272 vertical at all times, this means preferably including a series of meshing gears within the arm 277 in a manner well known in the art. Inasmuch as this construction also forms no part of the present invention it will not be further described and has not been illustrated in detail.

For moving the tongs to lift an article from the blow mold and move it to a desired position as on a removal conveyor 287, suitable means operated by the cylinder 280 are provided. This means is also conventional and preferably includes a rack carried by the piston rod of the cylinder and meshing with a pinion which is carried rigidly by the arm 277. Here again the construction is well known in the art and forms no necessary part of the present invention, so that it has not been illustrated in detail.

Operation

In its normal operation, the apparatus above described is entirely automatic and as will be obvious from the foregoing description, the individual instrumentalities are all operated by pneumatic pressure under control of the timer T. The operation of the device should be obvious from the foregoing description, but may be summarized as follows:

With the blank mold 9 shut, one of the neck rings 27 in position in association therewith, as shown in Fig. 1, the neck pin mechanism elevated and the neck pin 29 in its operative position, as shown in Fig. 5, the funnel 65 in its lowermost operative position associated with the blank mold, the charge is supplied to the blank mold, by any suitable means which may be an automatic feeder.

The charge is then settled by moving the plunger 70 angularly into alignment with the blank mold and downwardly into the blank mold to force the center portion of the glass downwardly and force the glass upwardly around the sides of the plunger to a predetermined level. This action is supplemented to some extent by the supplying of pressure through the several passages shown in Fig. 6 and into the upper end of the funnel and blank mold.

Once this operation has been completed or has been carried to the desired extent from point of view of time, the plunger 70 is withdrawn out of the mold and moved to its inoperative position. The funnel 65 is then also moved to its inoperative position and the counterblow baffle 107 is moved to its operative position on the top of the blank mold. At about this same time, pressure is exhausted from beneath the piston 31 controlling the neck pin 29 (Fig. 5) and the neck pin withdrawn under the action of the spring 59. Pressure may then be supplied from the timer to counterblow the blank through the pipe 64 and associated passages as above described. The formation of a blank has now been completed.

In preparation for the transfer of the blank, the neck pin structure is moved downwardly by the admission of pressure through the pipe 47 and exhausting thereof through pipe 48 and lowering the entire neck pin structure as shown in Fig. 5. The counterblow baffle is moved to its inoperative position and the blank mold opened. The neck rings are then reversed by moving them both through an angle of 180° by the mechanism described for accomplishing this purpose, thus bringing the blank under consideration to the first reheating position. At the same time the other neck ring has been moved to a position in alignment with the blank mold which may immediately be closed about it for the formation of the next succeeding blank which is done in a manner heretofore described. The provision of two neck rings, as disclosed herein, permits the initiation of the formation of the next article in the blank mold much sooner than would be the case were it necessary first to release the blank from a single neck ring and then return that neck ring to its initial position for cooperation with the blank mold.

At the first reheating position, the bottom plate 180 is moved into position by operation of the cylinder 190 and the blank is reheated for a desired time. It will be obvious from the foregoing, that the tongs may be closed beneath the neck ring at any desired adjustable time and the neck ring which has formed the neck of the blank being considered opened to permit the reheating of the neck portion of the blank, permitting an adjustable control of the duration of contact between this neck portion of the blank and the neck ring. Thus the period of contact between the neck ring and the glass may be adjusted independently of the total time of reheating of the body portion of the glass by closing the tongs and opening the neck ring earlier than is necessary for the mechanical transferring of the blank.

At some time prior to the next 180° rotation of the neck ring structure, the tongs move the blank being considered from the first to the second reheating position which is accomplished by the means hereinabove described, including the cylinder 223.

While at the second reheating position, the blank continues to reheat and elongate under control of the bottom plate 234, the movement of which is in turn controlled by the movement of the cam 244. Subsequent to the necessary or desired period of reheat at this position, the blank is moved by the tongs into the final blow mold which closes around it, the tongs are opened to release the blank to the blow mold and may be moved back for grasping the next succeeding blank. Final blowing takes place in the usual manner, after which the completed article is removed from the blow mold by the tongs 275 and the blow mold is ready for the receipt of the next succeeding blank.

From the foregoing, it will be obvious that as many as four charges of glass, all of which are supplied to the blank mold 9 may be simultaneously in the process of formation during the normal operation of the machine, one being in the blank mold, the second in the other neck ring at the first reheating position, the third in the tongs 191 at the second reheating position, and the fourth in the blow mold. Alternatively only one of the reheating positions may be occupied by a blank at a time, as will be obvious from the foregoing, all under control of the timer T, which is adjustable as to each operation controlled thereby.

Conclusion

While I have shown and described but one embodiment of my invention, it will be understood that the device as specifically described may be varied as to many of its individual details and equivalent mechanism may be substituted where desired, all within the spirit and scope of my invention. I do not wish to be limited, therefore, except by the scope of the appended claims, which are to be construed as broadly as the state of the prior art permits.

I claim:

1. Apparatus for forming hollow glass articles, comprising a support, a blank mold mounted in neck-down position on said support, means for forming charges of glass into blanks in said blank mold, a blow mold mounted in neck-up position on said support on substantially the same working level as said blank mold, means for blowing blanks to final form in said blow mold, and means for transferring blanks from said blank mold to said blow mold including plural blank gripping means for simultaneously inverting and laterally moving blanks, said plural blank gripping means being mounted and arranged for unidirectional orbital movement in a single predetermined path and cooperating successively with blanks formed successively in said blank mold.

2. Apparatus for forming hollow glass articles, comprising a support, a blank mold mounted in neck-down position on said support, means for forming charges of glass into blanks in said blank mold, a blow mold mounted in neck-up position on said support on substantially the same working level as said blank mold, means for blowing blanks to final form in said blow mold, and means for transferring blanks from said blank mold to said blow mold including duplex blank gripping means for inverting and laterally moving blanks, said duplex blank gripping means being mounted and arranged for unidirectional 180° steps of movement about a transversely extending substantially horizontal axis intermediate said blank and blow molds, the parts being so constructed and arranged that said blank gripping means will cooperate successively and alternately with blanks formed successively in said blank mold.

3. Apparatus for forming hollow glass articles, comprising a support, a blank mold mounted in neck-down position on said support, means for forming charges of glass into blanks in said blank mold, a blow mold mounted in neck-up position on said support on substantially the same working level as said blank mold, means for blowing blanks to final form in said blow mold, and means for transferring blanks from said blank mold to said blow mold including a movable support, two neck rings mounted thereon and arranged to be brought alternately by the movement of said movable support into cooperative relation with said blank mold for forming the neck portions of blanks formed therein, means for moving said movable support and the neck rings carried thereby in such manner as simultaneously to invert and move laterally a blank carried in one of said neck rings, both neck rings always moving in a single unidirectional orbital path.

4. Apparatus for forming hollow glass articles, comprising a support, a blank mold mounted in neck-down position on said support, means for forming charges of glass into blanks in said blank mold, a blow mold mounted in neck-up position on said support on substantially the same working level as said blank mold, means for blowing blanks to final form in said blow mold, and means for transferring blanks from said blank mold to said blow mold including a movable support mounted and arranged for unidirectional 180° steps of rotation about a substantially horizontal axis intermediate said blank and blow molds, a pair of neck rings carried by said movable support and arranged alternately to cooperate with said blank mold in forming blanks therein and thereafter to move said blanks toward said blow mold while reverting the blanks to neck-up positions, means for moving said movable support as aforesaid, and means for independently opening and closing said neck rings.

5. Apparatus for forming hollow glass articles, comprising a support, a blank mold on said support, means for forming charges of glass into blanks in said blank mold, a blow mold on said support, means for blowing blanks to final form in said blow mold, and means for transferring blanks from said blank mold to said blow mold including plural blank gripping means mounted and arranged for unidirectional orbital movement in a single predetermined path and operating successively in moving blanks from said blank mold to a predetermined position intermediate said blank and blow molds, and separate and distinct blank gripping means for moving blanks from said intermediate position to said blow mold.

6. Apparatus for forming hollow glass articles, comprising a support, a blank mold on said support, means for forming charges of glass into blanks in said blank mold, a blow mold on said support, means for blowing blanks to final form in said blow mold, and means for transferring blanks from said blank mold to said blow mold including plural blank gripping means mounted and arranged for unidirectional orbital movement in a single predetermined path and operating successively in moving blanks from said blank mold to a predetermined position intermediate said blank and blow molds, tongs separate and distinct from said plural blank gripping means for moving blanks from said predetermined position to a second intermediate position at which reheating of the blanks may take place and thence to said blow mold, and means for moving said tongs as aforesaid.

7. Apparatus for forming hollow glass articles, comprising a support, a blank mold mounted in neck-down position on said support, means for forming charges of glass into blanks in said blank mold, a blow mold mounted in neck-up position on said support on substantially the same working level as said blank mold, means for blowing blanks to final form in said blow mold, and means for transferring blanks from said blank mold to said blow mold including duplex blank gripping means for inverting and laterally moving blanks, said duplex blank gripping means being mounted and arranged for unidirectional 180° steps of movement about a transversely extending, substantially horizontal axis intermediate said blank and blow molds, tongs separate and distinct from said duplex blank gripping means for transferring blanks therefrom to said blow mold, and means for moving said tongs between a position to receive blanks from said duplex blank gripping means and a position at which the blanks may be enclosed by said blow mold.

8. Apparatus for forming hollow glass articles, comprising a support, a blank mold mounted in neck-down position on said support, means for forming charges of glass into blanks in said blank mold, a blow mold mounted in neck-up position on said support on substantially the same working level as said blank mold, means for blowing blanks to final form in said blow mold, and means for transferring blanks from said blank mold to said blow mold including duplex gripping means for inverting and laterally moving blanks, said duplex blank gripping means being mounted and arranged for unidirectional 180° steps of movement about a transversely extending, substantially horizontal axis intermediate said blank and blow molds, tongs separate and distinct from said duplex blank gripping means for transferring blanks therefrom to said blow mold, means for moving said tongs from a position to receive blanks from said duplex gripping means to an intermediate reheating position for the blanks and thereafter from said intermediate reheating position to a position at which the blanks may be enclosed by said blow mold, and means at said intermediate reheating position for controlling the elongation of blanks depending from said tongs during the period of reheating provided at that position.

9. Apparatus for forming hollow glass articles, comprising a support, a blank mold mounted in neck-down position on said support, means for forming charges of glass into blanks in said blank mold, a blow mold mounted in neck-up position on said support on substantially the same working level as said blank mold, means for blowing blanks to final form in said blow mold, and means for transferring blanks from said blank mold to said blow mold including a movable support, two neck rings mounted thereon and arranged to be brought alternately by movement of said movable support into cooperative relation with said blank mold for forming the neck portions of blanks formed therein, means for moving said movable support in a unidirectional manner so as to invert and simultaneously laterally move a blank supported by one of said neck rings, means for independently opening and closing said neck rings, tongs for receiving blanks from said neck rings and moving them to a position at which they may be enclosed by said blow mold, means for opening and closing said tongs, and means for adjustably timing the operations of opening said neck rings and closing and moving said tongs to provide an adjustable time of contact of the glass with said neck rings substantially independent of the timing of the contacts of other portions of the glass with the blank and blow molds.

10. Apparatus for forming hollow glass articles, comprising a support, a blank mold mounted in neck-down position on said support, means for forming charges of glass into blanks in said blank mold, a blow mold mounted in neck-up position on said support on substantially the same working level as said blank mold, means for blowing blanks to final form in said blow mold, and means for transferring blanks from said blank mold to said blow mold including a movable support, duplex blank gripping means carried by said movable support, means for rotating said movable support in a unidirectional manner about a transversely extending horizontal axis intermediate said blank and blow molds, means for independently opening and closing said duplex blank gripping means, tongs independent of said duplex blank gripping means for moving blanks therefrom to an intermediate reheating station and thence to a position at which said blow mold may enclose the blanks, means for moving said tongs as aforesaid, a bottom plate for supporting the bottom end of a blank at the common transfer station of said duplex blank gripping means and said tongs, means for moving said bottom plate to and from its operative blank supporting position, an elongation controlling bottom support for the blanks at the intermediate reheating station of said tongs, and means for moving said bottom support vertically during the elongation of the blanks at such intermediate reheating station to control the elongation of the blanks.

11. Apparatus for forming hollow glass articles, comprising a support, a blank mold and a blow mold mounted in relatively fixed positions on said support, means for forming charges of glass supplied to said blank mold into blanks therein, means for blowing blanks to final form in said blow mold, and two separate and distinct means employed successively in transferring each blank from said blank mold to said blow mold, the aforesaid means being so constructed and arranged as to maintain blanks with their longitudinal axes at all times in a single vertical plane during the entire formation of a glass article in both said molds and during the transfer of the blanks therebetween.

12. Apparatus for forming hollow glass articles, comprising a support, a blank mold and a blow mold mounted in relatively fixed positions on said support, means for forming charges of glass supplied to said blank mold into blanks therein, means for blowing blanks to final form in said blow mold, two separate and distinct means employed successively in transferring each blank from said blank mold to said blow mold, the transfer means aforesaid being so constructed, arranged and operated as to maintain the longitudinal axes of blanks being transferred at all times in the vertical plane containing the axes of said blank and blow molds and providing two intermediate reheating stations between said blank and blow molds which are successively occupied by each blank being transferred as aforesaid, and elongation controlling means for supporting the bottom portions of blanks being transferred at each of said intermediate reheating stations.

13. Apparatus for forming hollow glass articles, comprising a support, a blank mold and a blow mold on said support in relatively fixed positions on substantially the same working level and respectively in neck-down and neck-up positions, means for forming charges of glass supplied to said blank mold into blanks therein, means for blowing blanks to final form in said blow mold, two neck rings mounted for rotation about a transversely extending horizontal axis intermediate the blank and blow mold positions and adapted for alternate cooperation with said blank mold, said neck rings being so constructed, arranged and operated as to invert the blanks and simultaneously move them laterally in such manner that the longitudinal axis of a blank being transferred is maintained substantially tangent to the arc traversed by the center of gravity thereof during its transfer, means to impart unidirectional 180° intermittent movements to said neck rings about their axis of rotation, means for independently opening and closing said neck rings, tongs arranged to receive blanks from said neck rings at a reheating position spaced from said blank mold and to move the blanks first to a second reheating position nearer said blow mold than the first reheating position and thereafter to move the blanks from the second reheating position to a position at which the blanks may be enclosed by said blow mold, said neck rings and said tongs always maintaining the blanks being moved thereby in the vertical plane containing the longitudinal axes of said blank and blow molds, a bottom plate for cooperation with blanks at the first reheating position, means to move said bottom plate to and from its operative position, an elongation controlling bottom support for blanks at the second reheating position, cam controlled means for vertically moving said elongation controlling bottom support to follow and control the elongation of blanks at the second reheating position, pneumatic means for individually controlling the operations of all the aforesaid means, and timing means for controlling the admission and exhaust of pneumatic pressure for controlling all said pneumatic means.

14. Apparatus for forming hollow glass articles, comprising a blank mold, means for forming charges of glass supplied to said blank mold into blanks therein, a blow mold, means for blowing blanks to final form in said blow mold, two separate and distinct means employed successively in transferring each blank from said blank mold to said blow mold, and means for timing the operations of all the aforesaid means to the end that at one time during the normal continuous operation of the entire apparatus at least three charges of glass will be simultaneously in the process of formation into glass articles as follows: one being enclosed by said blank mold; at least one other, which was previously formed into a blank in said blank mold, reheating while being supported by one of said transferring means; and another, which was still earlier formed into a blank in said blank mold and reheated as aforesaid, being enclosed in said blow mold.

15. Apparatus for forming hollow glass articles, comprising a blank mold, means for forming charges of glass supplied to said blank mold into blanks therein, a blow mold, means for blowing blanks to final form in said blow mold, two separate and distinct means employed successively in transferring each blank from said blank mold to said blow mold, and means for timing the operations of all the aforesaid means to the end that at one time during the normal continuous operation of the entire apparatus four charges of glass, all of which are supplied in succession to said blank mold, will be simultaneously in the process of formation into glass articles as follows: the first being enclosed in said blank mold, the second and third being supported by said two separate and distinct transferring means respectively for reheating, and the fourth being enclosed by said blow mold.

16. Apparatus for forming hollow glass articles, comprising a support, a blank mold and a blow mold mounted in relatively fixed positions on said support, means for forming charges of glass supplied to said blank mold into blanks therein, means for blowing blanks to final form in said blow mold, two separate and distinct means employed successively in transferring each blank from said blank mold to said blow mold, and constructed and arranged to maintain the longitudinal axes of blanks being transferred at all times in the vertical plane containing the longitudinal axes of said blank and blow molds, and means for timing the operations of all the aforesaid means to the end that at one time during the normal continuous operation of the entire apparatus at least three charges of glass, all of which were supplied to said blank mold, will be simultaneously in the process of formation into glass articles as follows: one being enclosed by said blank mold, at least one other reheating while being supported by one of said transferring means, and another being enclosed in said blow mold.

17. Apparatus for forming hollow glass articles, comprising a support, a blank mold and a blow mold mounted in relatively fixed positions on said support, means for forming charges of glass supplied to said blank mold into blanks therein, means for blowing blanks to final form in said blow mold, two neck rings cooperating alternately with said blank mold in forming blanks and mounted and arranged for unidirectional rotation about a transversely extending substantially horizontal axis intermediate said blank and blow molds for moving blanks formed in said blank mold part way to said blow mold, tongs for receiving blanks from said neck rings and moving them to a position at which they may be enclosed by said blow mold, and means for timing the operations of all the aforesaid means to the end that at one time during the normal continuous operation of the entire apparatus at least three charges of glass, all of which were supplied to said blank mold, will be simultaneously in the process of formation into glass articles as follows: one being enclosed by said blank mold, at least one other reheating while being supported from above at some position in the path of movement of said tongs, and another being enclosed in said blow mold.

18. Apparatus for forming hollow glass articles, comprising a support, a blank mold and a blow mold mounted in relatively fixed positions on said support, means for forming charges of glass supplied to said blank mold into blanks therein, means for blowing blanks to final form in said blow mold, two neck rings cooperating alternately with said blank mold in forming blanks and mounted and arranged for unidirectional rotation about a transversely extending, substantially horizontal axis intermediate said blank and blow molds for moving blanks formed in said blank mold part way to said blow mold, tongs for receiving blanks from said neck rings and moving them to a position at which they may be enclosed by said blow mold, means for moving said tongs from their blank receiving position to an intermediate reheating position and thence to a position such that a blank held therein may be enclosed by said blow mold, independent means for opening and closing said neck rings, means for opening and closing said tongs, said neck ring opening means and said tongs closing means being adjustable so as to adjust the duration of contact of each neck ring with the blanks without affecting the total reheating time of the blanks, and means for timing the operations of all the aforesaid means to the end that at one time during the normal continuous operation of the entire apparatus at least three charges of glass, all of which were supplied to said blank mold, will be simultaneously in the process of formation into glass articles as follows: one being enclosed by said blank mold, at least one other reheating while being supported from above at some position in the path of movement of said tongs, and another being enclosed in said blow mold.

19. Apparatus for forming hollow glass articles, comprising a stationary support, a blank mold and a blow mold mounted in relatively fixed positions on said support on substantially the same working level and respectively in neck-down and neck-up positions, means for forming charges of glass supplied to said blank mold into blanks therein, means for blowing blanks to final form in said blow mold, two neck rings cooperating alternately with said blank mold in forming blanks and mounted and arranged for unidirectional 180° steps of rotation about a transversely extending, substantially horizontal axis intermediate said blank and blow molds for moving blanks formed in said blank mold to a first reheating position intermediate said blank and blow molds at which the blanks are supported neck-uppermost, tongs for receiving blanks from said neck rings at the first reheating position and for moving them to a second reheating position and thence to a position at which the blanks may be enclosed by said blow mold, means for moving said tongs as aforesaid, means for independently opening and closing said neck rings, means for opening and closing said tongs, the neck ring and tongs opening and closing means and the tongs moving means all being adjustable to adjust the period of neck ring contact with the glass independently of the total reheating period provided, and means for timing the operations of all the aforesaid means to the end that at one time during the normal continuous operation of the entire apparatus at least four charges of glass, all of which were supplied to said blank mold, will be simultaneously in the process of formation into glass articles as follows: one being enclosed by said blank mold, the second being supported in one of said neck rings at the first reheating position, the third being supported by said tongs at the second reheating position, and the fourth being enclosed in said blow mold.

20. Apparatus for forming hollow glass articles, comprising a blank mold, means for forming a charge of glass supplied to said blank mold into a blank therein, a blow mold, means for blowing a blank to final form in said blow mold, and means for transferring a blank formed in said blank mold to said blow mold including a neck ring cooperating with said blank mold in the formation of a blank therein, means for moving said neck ring with the blank grasped therein from the blank mold toward the blow mold, means for opening said neck ring to release the blank grasped therein, and means wholly separate from said neck ring for engaging the blank at the position at which it is released by said neck ring and moving it to a position at which it may be enclosed by said blow mold.

21. Apparatus for forming hollow glass articles, comprising a blank mold, means for forming charges of glass supplied to said blank mold into blanks therein, a blow mold cooperating solely with said blank mold, means for blowing blanks to final form in said blow mold, and means for transferring blanks formed in said blank mold to said blow mold including a plurality of neck rings cooperable successively with said blank mold in forming blanks therein and thereafter moving said blanks toward said blow mold, and tongs separate and distinct from said neck rings for receiving blanks therefrom and for moving the blanks to a position at which they may be enclosed by said blow mold.

22. Apparatus for forming hollow glass articles, comprising a blank mold, a neck ring cooperating with said blank mold in forming blanks, means for forming charges of glass supplied to said blank mold and said neck ring into blanks therein, a blow mold adapted to receive blanks from said blank mold, means for blowing blanks to final form in said blow mold, and means for transferring blanks from said blank mold to said blow mold including means for moving said neck ring from its position in cooperation with said blank mold part way to said blow mold, means for opening and closing said neck ring, tongs for transferring the blanks the remainder of the distance to the position at which they may be enclosed by said blow mold, means for opening and closing said tongs, and means for adjustably varying the times of opening of said neck ring and the closing of said tongs for adjustably determining the period of contact between the glass and the neck ring independently of the duration of the reheating period provided for the body portions of the blanks.

ALGY J. SMITH.